(12) United States Patent
Yang

(10) Patent No.: US 8,059,583 B2
(45) Date of Patent: Nov. 15, 2011

(54) METHOD AND SYSTEM FOR IMPLEMENTING TRANSMITTING DIVERSITY AND RECEIVING DIVERSITY

(75) Inventor: Yuli Yang, Guangdong (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 791 days.

(21) Appl. No.: 11/850,309

(22) Filed: Sep. 5, 2007
(Under 37 CFR 1.47)

(65) Prior Publication Data
US 2008/0292011 A1 Nov. 27, 2008

(30) Foreign Application Priority Data
Sep. 5, 2006 (CN) .......................... 2006 1 0127121

(51) Int. Cl.
*H04W 4/00* (2009.01)

(52) U.S. Cl. .......................... 370/328; 370/386; 370/431

(58) Field of Classification Search .................. 370/208, 370/325, 328, 386, 431; 455/101, 103, 132, 455/136, 168.1, 422.1
See application file for complete search history.

(56) References Cited

U.S. PATENT DOCUMENTS

| | | | | |
|---|---|---|---|---|
| 2002/0044549 A1* | 4/2002 | Johansson et al. | ............ | 370/386 |
| 2003/0236076 A1* | 12/2003 | Brunel | ............ | 455/101 |
| 2004/0114618 A1* | 6/2004 | Tong et al. | ............ | 370/431 |
| 2005/0243756 A1* | 11/2005 | Cleveland et al. | ............ | 370/328 |
| 2006/0193280 A1* | 8/2006 | Lee et al. | ............ | 370/315 |
| 2006/0217093 A1* | 9/2006 | Wang et al. | ............ | 455/136 |

FOREIGN PATENT DOCUMENTS

| | | |
|---|---|---|
| CN | 1671074 A | 9/2005 |
| CN | 1671074 A | 9/2005 |
| CN | 1748383 A | 3/2006 |
| CN | 1748383 A | 3/2006 |
| WO | WO 2005/107103 A1 | 11/2005 |

OTHER PUBLICATIONS

Laneman et al. "Cooperative Diversity in Wireless Networks: Efficient Protocols and Outage Behavior", IEEE Transactions on Information Theory, vol. 50, No. 12, Dec. 2004, pp. 3062-3080.*
International Search Report dated Sep. 6, 2007 in connection with International Patent Application No. PCT/CN2007/070137.
"IEEE P802.22™/D0.1, Draft Standard for Wireless Regional Area Networks Part 22: Cognitive Wireless RAN Medium Access Control (MAC) and Physical Layer (PHY) specification: Policies and procedures for operation in the TV Bands", May 2006, 304 pages. Written Opinion of the International Searching Authority dated Sep. 6, 2007 in connection with International Patent Application No. PCT/CN2007/070137.
Office Action dated Apr. 21, 2010 in connection with Chinese Patent Application No. 200610127121.8.
Partial Translation of Office Action dated Dec. 16, 2010 in connection with Chinese Patent Application No. 200610127121.8.

* cited by examiner

*Primary Examiner* — Andrew Lai

(57) ABSTRACT

The method for implementing transmitting diversity includes receiving a symbol from a destination mobile terminal, by a mobile terminal which is in the same mobile terminal group with the destination mobile terminal, wherein the symbol is also sent from the destination mobile terminal to a base station; and processing, by the mobile terminal, the symbol and transmitting the symbol processed to the base station. The method for implementing receiving diversity includes receiving, by a mobile terminal, a symbol from a base station; finding a destination mobile terminal which is in the same mobile terminal group with the mobile terminal if the mobile terminal is not the destination of the symbol; and forwarding the symbol to the destination mobile terminal. Embodiments of the present invention solve the problem of excessive size of a mobile terminal used for implementing transmitting diversity and receiving diversity, and also reduces bit error rate (BER).

10 Claims, 11 Drawing Sheets

METHOD AND SYSTEM FOR IMPLEMENTING TRANSMITTING DIVERSITY AND RECEIVING DIVERSITY

FIELD OF THE TECHNOLOGY

The present invention relates to radio transmission technologies, and particularly, to methods and systems for implementing transmitting diversity and receiving diversity.

BACKGROUND OF THE INVENTION

The demand for a better communication quality and a higher transmission rate is brought forward by a future radio communication system, and a Multi-Input Multi-Output (MIMO) system with multiple antennas is extensively expected for its better channel capacity. A diversity technique is of a special importance among massive techniques which are researched and applied to the MIMO system. According to the diversity technique, a signal in a wireless network is transmitted or received via multiple antennas so as to prevent a system loss; here the system loss is caused by a deep channel fading from which the signal suffers. The application of the diversity technique is based on communication channels independent of each other. Generally speaking, two spatial channels provided by two antennas are considered to be independent of each other when the distance between the two antennas is greater than half of a wavelength adopted. For example, in wireless LAN series standards which are compatible with the Bluetooth technology, some standards may require that two antennas are more than 7 cm away from each other to ensure that the spatial channels provided by the antennas are independent of each other, while other standards may require that the two antennas are more than 2.8 m away from each other. It can be concluded that, since multiple antennas cannot be installed into sufficient space in a mobile terminal to ensure the independence of multiple communication channels due to the volume limitation of the mobile terminal, a receive diversity technique on the downlink and a transmitting diversity technique in uplink cannot be implemented.

In a conventional method, a virtual multiple antenna system consisting of a plurality of mobile terminals is capable of improving spectrum efficiency in the radio communication system. In the virtual multiple antenna system, a plurality of mobile terminals are regarded as one transmission device. In uplink, signals are transmitted to a base station which may isolate the signals from each mobile terminal by using decoding principles in a spatial multiplex technique.

For example, in uplink of the radio communication system, there are two mobile terminals and a base station, the two mobile terminals can be regarded as a transmission devices capable of transmitting signals to the base station with the antennas of the mobile terminals. The base station receives a data stream which is combined by two independent data streams. It can be seen that the virtual multiple antenna transmission device adopts a spatial multiplexing technique.

FIG. 1 is a schematic diagram illustrating a virtual multiple antenna system, in which Mobile Terminal 1 transmits signals to a base station via an antenna while Mobile Terminal 2 also transmits signals to the base station via its antenna. In such case, the whole uplink can be regarded as a virtual multiple antenna transmission system which equals a transmitter with two antennas capable of transmitting signals to the base station, and the base station receives two independent data streams.

However, the above scheme is just applicable to the transmission of uplink and unable to be used in the transmission of downlink, that is to say, the virtual multiple antenna system is just able to implement transmitting diversity but unable to implement receiving diversity.

In addition, the spatial multiplexing technique used in the scheme is unable to get a low system Bit Error Rate (BER) while improving spectrum efficiency. Since the signals received in the scheme are the combination of signals transmitted by a plurality of mobile terminals, the interference among the signals transmitted by a plurality of mobile terminals imposes on the virtual multiple antenna system a BER higher than the BER in a single antenna system. Even though the maximum likelihood (ML) criteria detection which is the most effective error detection method is adopted in the receiver, the BER of the virtual multiple antenna system is still relatively high.

SUMMARY OF THE INVENTION

Embodiments of the present invention provide methods and systems for implementing transmitting diversity and receive diversity so as to reduce BER in wireless transmission.

A system for implementing transmitting diversity includes a destination mobile terminal in communication with a base station and at least one other mobile terminal, wherein
  the destination mobile terminal is capable of:
  transmitting a symbol to the base station; and
  forwarding the symbol to at least one other mobile terminal which is in the same mobile terminal group with the destination mobile terminal.

A system for implementing transmitting diversity includes a mobile terminal in communication with a destination mobile terminal which is in the same mobile terminal group with the mobile terminal and a base station, wherein
  the mobile terminal is capable of:
  receiving a symbol from the destination mobile terminal;
  processing the symbol received from the destination mobile terminal; and
  transmitting the symbol processed to the base station.

A system for implementing receiving diversity includes a mobile terminal in communication with a destination mobile which is in the same mobile terminal group with the mobile terminal and a base station, wherein
  the mobile terminal is capable of:
  receiving a symbol from the base station;
  finding the destination mobile terminal if the mobile terminal is not the destination of the symbol; and
  forwarding the symbol to the destination mobile terminal.

A system for implementing receiving diversity, includes a destination mobile terminal in communication with a mobile terminal which is in the same mobile terminal group with the destination mobile terminal and a base station
  the destination mobile terminal is capable of:
  receiving a symbol from the base station;
  receiving a forwarded symbol from the mobile terminal, wherein the forwarded symbol is originally from the base station;
  combining the forwarded symbol from the mobile terminal and the symbol from the base station, and obtaining an estimate value of an original transmitted symbol.

A system for implementing symbol transmission, includes a base station in communication with a destination mobile terminal and a mobile terminal which is in the same mobile terminal group with the destination mobile terminal, wherein the base station is capable of:
receiving an uplink symbol transmitted directly from the destination mobile terminal;
receiving an forwarded uplink symbol from the mobile terminal, wherein the forwarded uplink symbol is originally from the destination mobile terminal;
combining the uplink symbol received from the destination mobile terminal and the uplink symbol forwarded by the at least one other mobile terminal; and
obtaining an estimate value of an original transmitted uplink symbol.

A method for implementing transmitting diversity includes:
receiving a symbol from a destination mobile terminal, by a mobile terminal which is in the same mobile terminal group with the destination mobile terminal, wherein the symbol is also sent from the destination mobile terminal to a base station;
processing, by the mobile terminal, the symbol and transmitting the symbol processed to the base station;
wherein processing the symbol and transmitting the symbol processed to the base station comprises:
processing, by the mobile terminal, the symbol according to space-time coding rules, and
transmitting the symbol processed to the base station via time division:
wherein transmitting the symbol processed to the base station via time division comprises:
transmitting, if the symbol is a real number signal and the number of mobile terminals in the mobile terminal group is N, the symbol or the reciprocal value of the symbol to the base station at N consecutive symbol periods by the N mobile terminals; and
wherein the N*N symbols or the reciprocal values of the N*N symbols transmitted at the N symbol periods are determined by an N-order orthogonal matrix, each column of the orthogonal matrix corresponds to the signals transmitted by a mobile terminal in the mobile terminal group at N consecutive symbol periods and each row of the orthogonal matrix corresponds to the signals transmitted by all mobile terminals in the mobile terminal group at a symbol period.

A method for implementing transmitting diversity includes:
receiving a symbol from a destination mobile terminal, by a mobile terminal which is in the same mobile terminal group with the destination mobile terminal, wherein the symbol is also sent from the destination mobile terminal to a base station;
processing, by the mobile terminal, the symbol the symbol processed to the base station;
wherein processing the symbol and transmitting the symbol processed to the base station comprises:
processing, by the mobile terminal, the symbol according to space-time coding rules, and
transmitting the symbol processed to the base station via time division; and
wherein transmitting the symbol processed to the base station via time division comprises:
transmitting, if the symbol is a complex number signal and the number of mobile terminals in the mobile terminal group is N, the symbol, the reciprocal value of the symbol, the conjugation of the symbol or the negative conjugation of the symbol to the base station at 2N consecutive symbol periods by the N mobile terminals.

A method for implementing receiving diversity includes:
receiving, by a mobile terminal, a symbol from a base station;
finding a destination mobile terminal which is in the same mobile terminal group with the mobile terminal if the mobile terminal is not the destination of the symbol; and
forwarding the symbol to the destination mobile terminal.

According to embodiments of the present invention, a mobile terminal first transmits a symbol to be transmitted to a base station, to at lease one other mobile terminal in the same mobile terminal group with the mobile terminal; therefore, transmitting diversity and receive diversity can be implemented with the mobile terminals without increase of the size of the mobile terminal. Given the same Signal to Noise Ratio (SNR) and system structure, the virtual multiple antenna system in embodiments of the present invention provides a much lower system BER than the conventional virtual multiple antenna system does.

DETAILED DESCRIPTION OF THE INVENTION

The present invention is further described as follows in detail according to the accompanying drawings and embodiments.

Short range wireless transmission technologies, e.g. the infrared technology, Bluetooth technology or Zigbee technology, are effectively utilized in embodiments of the present invention to group multiple mobile terminals in the coverage of short range wireless transmission. A mobile terminal is equipped with a single antenna in preferred embodiments of the present invention, while a mobile terminal with multiple antennas can also be applied in embodiments of the present invention. A mobile terminal group can be regarded as a virtual multiple antenna system. Multiple mobile terminals in the virtual multiple antenna system for implementing transmitting or receiving diversity which was the privilege of a antenna transmitter or receiver. The problem that the mobile terminal has two or more antennas for implementing a diversity technique and obtaining a diversity gain, which makes the size of the mobile terminal excessively large, is avoided.

The short range wireless transmission technology, e.g. the infrared technology, Bluetooth technology or Zigbee technology, is applied to embodiments of the present invention. The infrared technology is suitable to low-cost, cross-platform and point-to-point high speed data transmission applications and is able to provide a transmission rate at 16 Mbps at the maximum. It is very convenient to use the infrared technology which requires minimum configuration for mobile phone to mobile phone data transmission in general. The infrared technology is supported and employed by a number of software and hardware manufacturers around the globe, the infrared technology support is added into all mainstream software and hardware platforms at present and used widely by mobile computing and communication devices. An infrared interface is a configuration standard in mobile phones of the new generation, which supports data communication between the mobile phones and computers or other digital devices.

The Bluetooth technology is designed to replace cables and is orientated in low-cost, short-range and low transmission rate wireless transmission. Today the Bluetooth technology has evolved into a personal information network technology, which connects devices with embedded Bluetooth chips to provide voice and data access services to achieve automatic exchange and processing of information. The Bluetooth technology can transmit data without aiming precisely at a device with a transmission rate at 1 Mbps.

Figure 1:
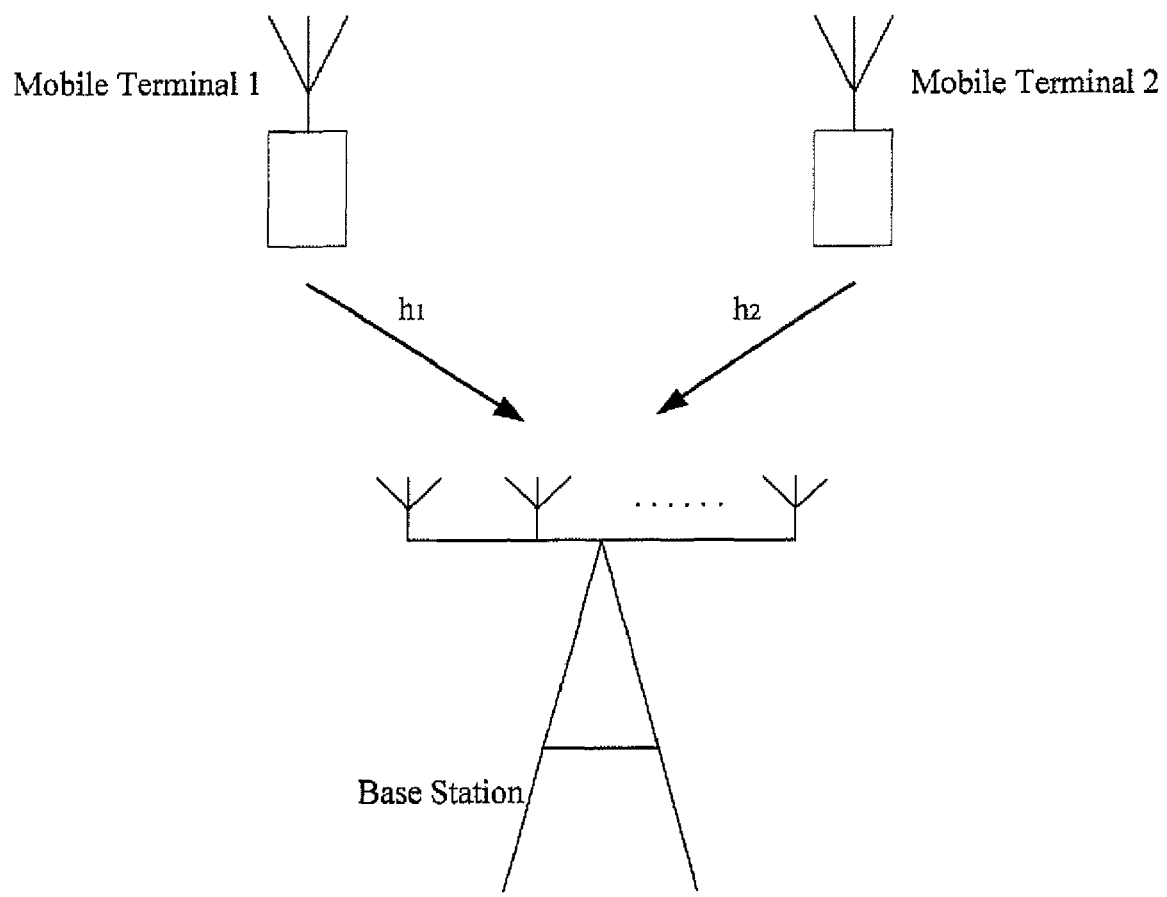
FIG. 1 is a schematic diagram illustrating a principle of implementing an uplink spatial multiplex in a conventional method.
Figure 2A:
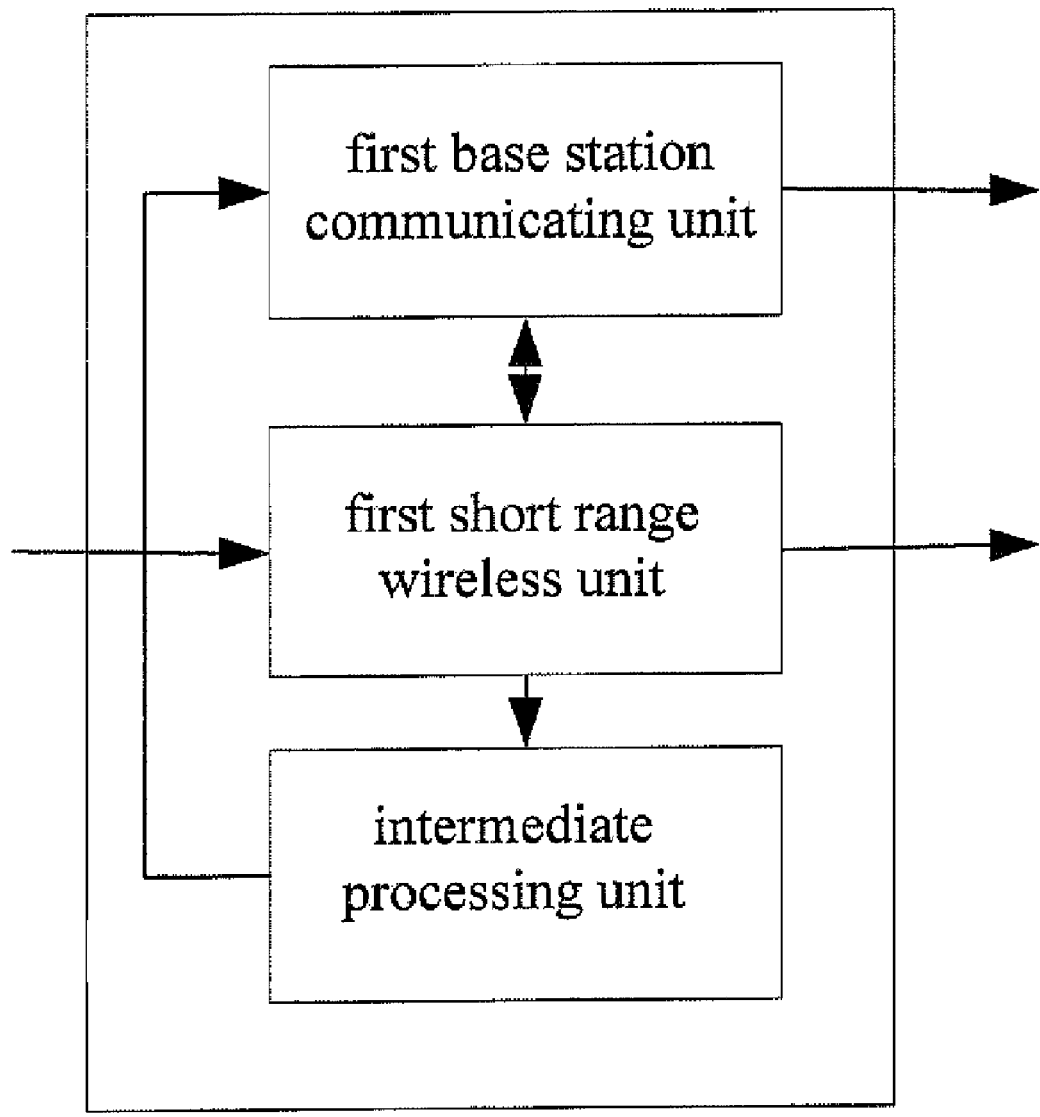
FIG. 2a is a structure diagram illustrating a mobile terminal for implementing transmitting diversity according to an embodiment of the present invention.

FIG. 2a is a structure diagram illustrating a mobile terminal for implementing transmitting diversity according to an embodiment of the present invention. As shown in FIG. 2a, the mobile terminal includes:
 a first base station communicating unit, capable of transmitting a symbol to a base station;
 a first short range wireless unit, capable of transmitting the symbol to other mobile terminals which are in the same mobile terminal group with the mobile terminal, and receiving a symbol from other mobile terminals which are in the same mobile terminal group with the mobile terminal by using the short range wireless transmission technology; and
 an intermediate processing unit, capable of processing the symbol received by the first short range wireless unit and transmitting the symbol processed to the first base station communicating unit which further transmits the symbol processed to the base station.

The intermediate processing unit may be a space-time coding intermediate processing unit which may process the symbol received by the first short range wireless unit according to space-time coding rules and transmits the symbol processed to the first base station communicating unit. The first base station communicating unit may be a base station time division communicating unit which transmits the symbol processed from the space-time coding intermediate processing unit to the base station via time division.

The first short range unit is further capable of searching for other mobile terminals in the coverage of short range wireless transmission and transmitting information of the found mobile terminals to the first base station communicating unit. The first base station communicating unit is further capable of transmitting the information to the base station.

The mobile terminals in embodiments of the present invention may be single-antenna mobile terminals which are preferred, or multi-antenna mobile terminals. The short rang wireless transmission technology adopted may be the infrared technology, Bluetooth technology or Zigbee technology.

The description of the mobile terminal used for implementing transmitting diversity, as shown in FIG. 2a, is ended here.

Figure 2B:
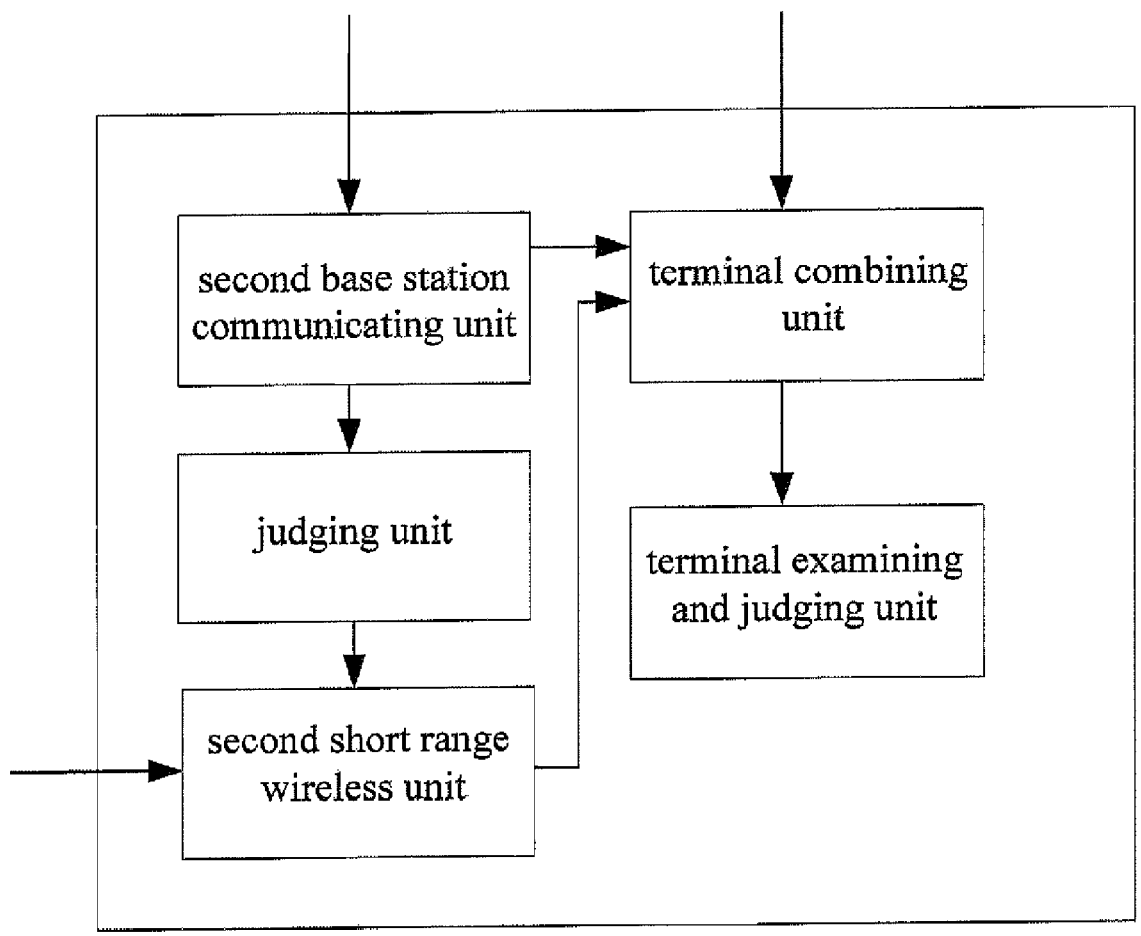
FIG. 2b is a structure diagram illustrating a mobile terminal for implementing receiving diversity according to an embodiment of the present invention.

FIG. 2b is a structure diagram illustrating a mobile terminal for implementing receiving diversity according to an embodiment of the present invention. As shown in FIG. 2b, the mobile terminal includes: a second base station communicating unit, a judging unit, a terminal combining unit, a second short range wireless unit and a terminal examining and judging unit.

The second base station communicating unit is capable of receiving a symbol from a base station and transmitting the symbol to the judging unit.

The judging unit is capable of finding a destination mobile terminal if the destination of the symbol is not the mobile terminal, and forwarding the symbol to the second short range wireless unit.

The second short range wireless unit is capable of forwarding the symbol to a destination mobile terminal which is in the same mobile terminal group with the mobile terminal by using the short range wireless transmission technology. The second short range wireless unit is further capable of receiving a symbol from another mobile terminal that is in the same mobile terminal group with the mobile terminal, and transmitting the received symbol to the terminal combining unit.

The terminal combining unit is capable of combining the symbol from another mobile terminal that is in the same mobile terminal group with the mobile terminal and the symbol from the base station. The symbol from another mobile terminal and the symbol from the base station are symbols which are sent to another mobile terminal and the base station by the same mobile station.

The terminal examining and judging unit is capable of examining and judging the symbol processed by the terminal combining unit to obtain an estimate value of an original transmitted symbol.

In the embodiment, the short rang wireless transmission technology adopted may be the infrared technology, Bluetooth technology, or Zigbee technology. The mobile terminals in embodiments of the present invention may be single-antenna mobile terminals or multi-antenna mobile terminals while the single-antenna mobile terminals provide better technical effect and are preferred in the embodiment of the present invention.

The description of the mobile terminal used for implementing receiving diversity, as shown in FIG. 2b, is ended here.

The mobile terminals used for implementing transmitting diversity and receiving diversity in embodiments shown in FIGS. 2a and 2b may include a destination mobile terminal and non-destination mobile terminals, both the destination mobile terminal and non-destination mobile terminals belong to the same mobile terminal group.

The destination mobile terminal is capable of transmitting a symbol to the base station, transmitting the symbol to other mobile terminals in the same mobile terminal group with the mobile terminal by using the short range wireless transmission technology, receiving symbols from the base station and other mobile terminals in the same mobile terminal group with the mobile terminal, combining and examining the symbols received to obtain the original transmitted symbols. The symbols received from the base station and at least one other mobile terminal are symbols which are sent to the base station and the at least one other mobile terminal by the same mobile terminal. In addition, the destination mobile terminal is further capable of searching for other mobile terminals in the coverage of short range wireless transmission and transmitting the information of the found mobile terminals and mobile terminal group configuration information to the base station.

A non-destination mobile terminal is capable of receiving the symbol from the base station, judging the symbol, and, if the destination of the symbol is not the current mobile terminal which has received the symbol, finding and forwarding the symbol to the destination mobile terminal by using the short range wireless transmission technology. The non-destination mobile terminal is further capable of receiving a symbol by using the short range wireless transmission technology from another mobile terminal in the same mobile terminal group with the non-destination mobile terminal, processing the symbol by using space-time coding rules and transmitting the symbol processed to the base station via time division.

Figure 2C:
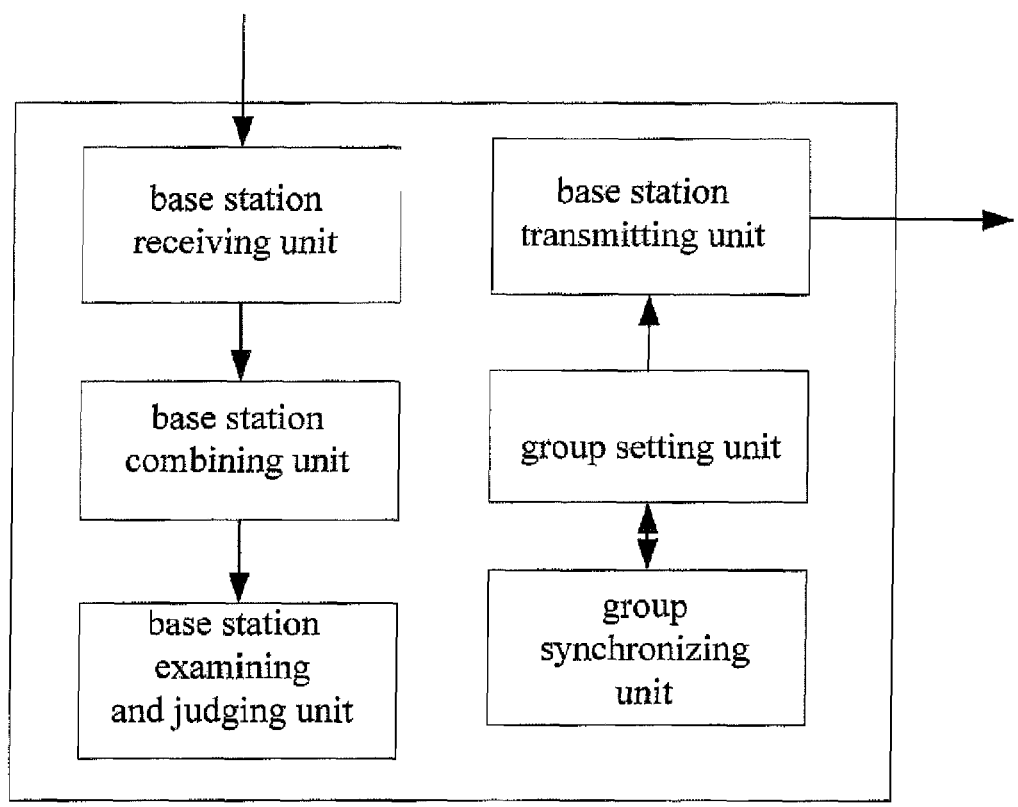
FIG. 2c is a structure diagram illustrating a base station according to an embodiment of the present invention.

FIG. 2c is a structure diagram illustrating a base station according to an embodiment of the present invention. As shown in FIG. 2c, the base station includes a base station receiving unit, a base station transmitting unit, a base station combining unit, a base station examining and judging unit, a group setting unit, a group synchronizing unit and a group transmitting unit.

The base station receiving unit is capable of receiving an uplink symbol transmitted directly from a destination mobile terminal and the uplink symbol from at least one mobile terminal which is in the same mobile terminal group with the destination mobile terminal.

The base station combining unit is capable of combining the received uplink symbols to acquire a combined uplink symbol, and transmitting the combined uplink symbol to the base station examining and judging unit.

The base station examining and judging unit is capable of examining and judging the combined uplink symbol to obtain an estimate value of an original transmitted uplink symbol.

The base station transmitting unit is capable of transmitting a downlink symbol to the destination mobile terminal and at least one mobile terminal in the same mobile terminal group with the destination mobile terminal.

The group setting unit is capable of grouping at most N−1 mobile terminals in the coverage of short range wireless transmission from the mobile terminal into a mobile terminal group and obtaining mobile terminal group configuration information. Here, N equals the diversity order supported by the base station.

The group synchronizing unit is capable of synchronizing the mobile terminals in the mobile terminal group.

The base station transmitting unit is further capable of transmitting the mobile terminal group configuration information received from the group setting unit to the mobile terminals in the mobile terminal group.

The description of the base station shown in FIG. 2c is ended here.

Figure 3:
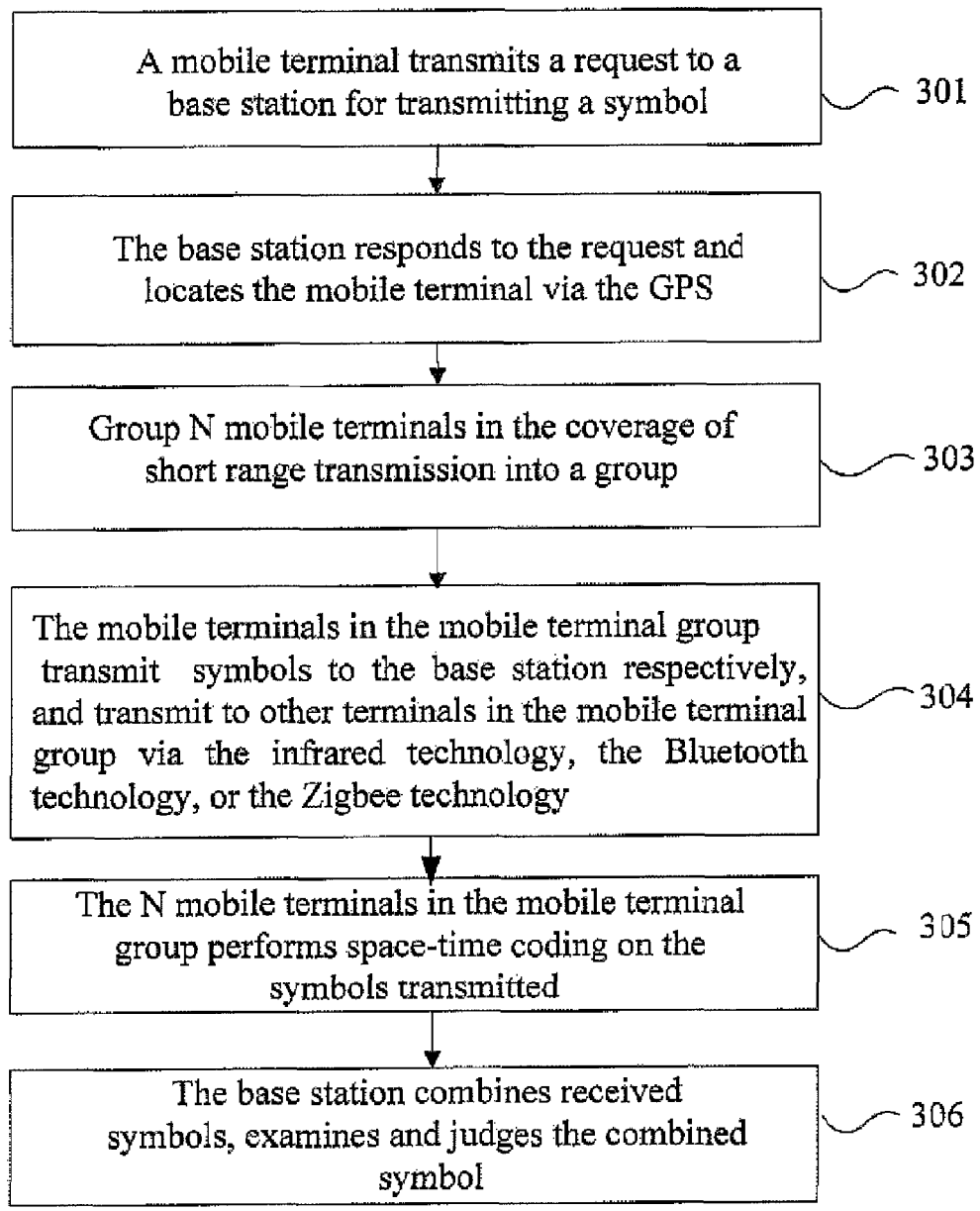
FIG. 3 is a simplified flow chart of a method for implementing transmitting diversity on mobile terminals according to the first embodiment of the present invention.

FIG. 3 is a simplified flow chart of a method for implementing transmitting diversity on mobile terminals according to the first embodiment of the present invention. The method includes the following processes.

In block 301, a mobile terminal in the service area of a base station transmits a request to the base station, requesting to transmit a symbol to the base station.

In block 302, the base station locates the mobile terminal with the Global Positioning System (GPS) or via other methods, and estimates the distance from the base station to the mobile terminal.

In block 303, at most N mobile terminals in the coverage of short range wireless transmission are grouped into a mobile terminal group, mobile terminals in the mobile terminal group are synchronized and mobile terminal group configuration information is transmitted to the mobile terminals in the mobile terminal group.

In this block, methods for setting the mobile terminal group in the coverage of short range wireless transmission and transmitting the mobile terminal group configuration information to the mobile terminals in the mobile terminal group are described as follows.

According to the first method, the base station receives the request for transmitting the symbol from the mobile terminal, groups at most N−1 mobile terminals in the coverage of short range wireless transmission from the mobile terminal, and obtains the mobile terminal group configuration information. N equals a diversity order supported by the base station. The base station synchronizes the mobile terminals in the mobile terminal group and transmits the mobile terminal group configuration information to the mobile terminals in the mobile terminal group.

According to the second method, a mobile terminal in a self-organized network searches for other mobile terminals in the coverage of short range wireless transmission from the mobile terminal and sends information of the found mobiles terminals to the base station. The base station groups at most N mobile terminals including the mobile terminal into a mobile terminal group, and obtains the mobile terminal configuration information, here N equals the diversity order supported by the base station. The base station synchronizes the mobile terminals in the mobile terminal group, and transmits the mobile terminal group configuration information to the mobile terminals in the mobile terminal group.

According to the third method, a mobile terminal in a self-organized network searches for N−1 other mobile terminals in the coverage of short range wireless transmission from the mobile terminal, forms a mobile terminal group with the found mobile terminals, obtains the mobile terminal group configuration information, and transmits the mobile terminal group configuration information to the base station as well as to the N−1 mobile terminals in the mobile terminal group.

In block 304, being synchronized, the mobile terminals in the mobile terminal group transmit symbols to the base station, and transmit the symbols which are transmitted to the base station to each other in the mobile terminal group by using the infrared technology, Bluetooth technology or Zigbee technology.

In block 305, at the following N−1 or 2N−1 symbol periods, N mobile terminals in the group or a part of the N mobile terminals cooperate to form the symbols into an orthogonal matrix or quasi-orthogonal matrix. The space-time coding of the mobile terminal group in uplink is achieved. When the symbols are real number signals, the whole transmission process requires another N−1 symbol period; and when the symbols are complex number signals, the whole transmission process requires another 2N−1 symbol period.

In block 306, the base station combines the received symbols, examines and judges the symbol combined according to the ML criteria.

The mobile terminals in the embodiment of the present invention may be single-antenna mobile terminals which attain better technical effect, or multi-antenna mobile terminals.

Figure 4:
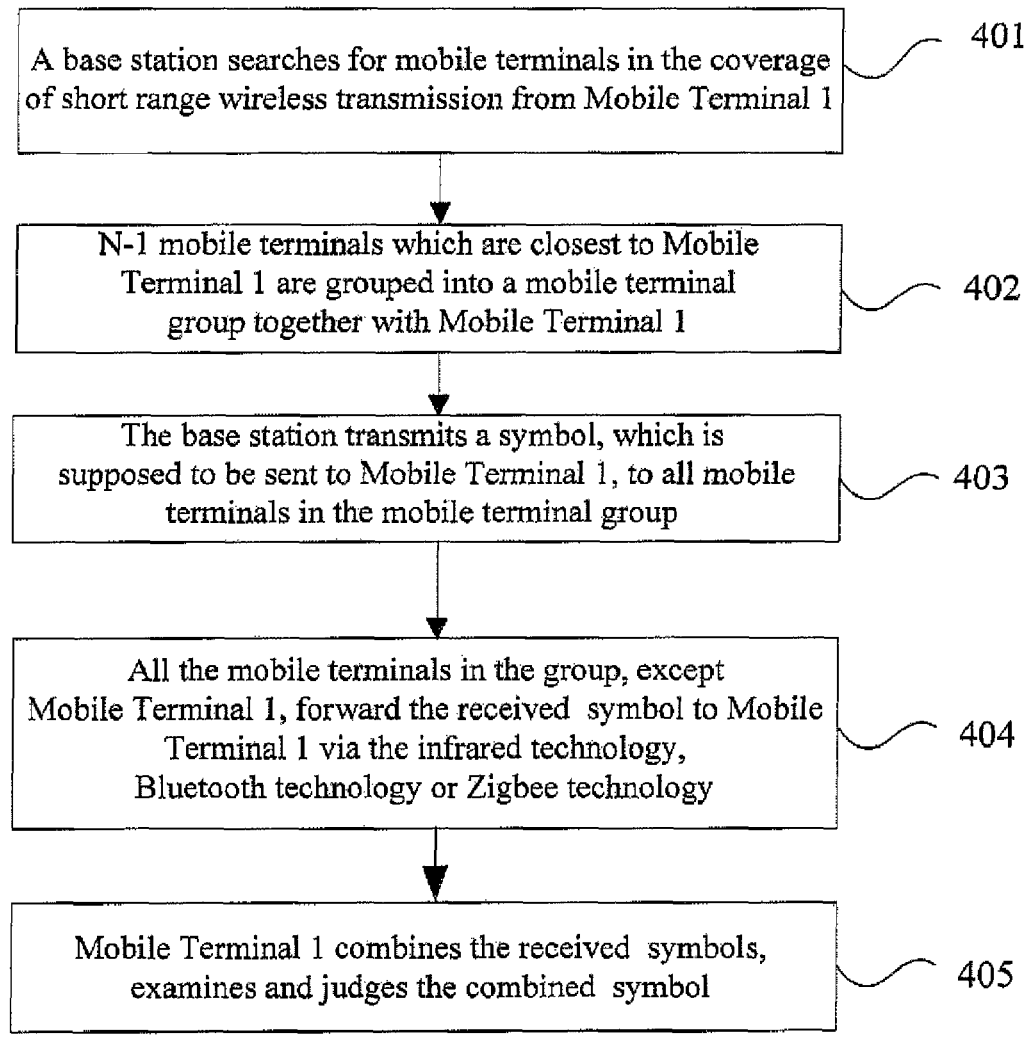
FIG. 4 is a simplified flow chart of a method for implementing receiving diversity on mobile terminals according to the second embodiment of the present invention.

FIG. 4 is a simplified flow chart of a method for implementing receiving diversity on mobile terminals according to the second embodiment of the present invention. The method includes the following processes.

In block 401, if a base station transmits a symbol to Mobile Terminal 1, the base station makes sure via the GPS or other locating methods that Mobile Terminal 1 is in the service area of the base station, and searches for other mobile terminals in the coverage of short range wireless transmission from Mobile Terminal 1.

In block 402, N−1 mobile terminals which are closest to Mobile Terminal 1 form a mobile terminal group with Mobile Terminal 1, the N−1 mobile terminals in the mobile terminal group assist Mobile Terminal 1 in receiving the symbol.

In this block, methods for grouping Mobile terminal 1 and the N−1 mobile terminals which are closest to Mobile Terminal 1 are described as follows.

According to the first method, the base station receives a request for transmitting a symbol from Mobile Terminal 1, and groups Mobile terminal 1 and at most N−1 mobile terminals in the coverage of short range wireless transmission from Mobile Terminal 1 into a mobile terminal group.

According to the second method, being a mobile terminal of a self-organized network, Mobile Terminal 1 searches for other mobile terminals in the coverage of short range wireless transmission from Mobile Terminal 1 and sends information of the found mobiles terminals to the base station. The base station groups N mobile terminals including Mobile Terminal 1 into a mobile terminal group.

According to the third method, Mobile Terminal 1 searches for other mobile terminals in the coverage of short range wireless transmission from Mobile Terminal 1, forms a mobile terminal group with the found mobile terminals, obtains mobile terminal group configuration information, and transmits the mobile terminal group configuration information to the base station as well as to other mobile terminals in the mobile terminal group.

In block 403, having synchronized the mobile terminals in the group, the base station transmits the mobile terminal group configuration information to the mobile terminals in the mobile terminal group, and transmits the symbol, which is sent to Mobile Terminal 1, to Mobile Terminal 1 and at least one mobile terminal in the mobile terminal group.

In block 404, upon the receipt of the symbol, at least one mobile terminal in the group except Mobile Terminal 1, forwards the received symbol to Mobile Terminal 1 via the infrared technology, Bluetooth technology or Zigbee technology.

Preferably, all other mobile terminals in the group, except Mobile Terminal 1, forward the received symbols to Mobile Terminal 1 via the infrared technology, Bluetooth technology or Zigbee technology.

In block 405, Mobile Terminal 1 combines the received symbols, examines and judges the combined symbol according to the ML criteria to obtain an estimate value of an original transmitted symbol.

According to the third embodiment of the present invention, a multiple antenna system includes two mobile terminals. Provided the base station has a single antenna, fading channels between Mobile Terminal 1 and Mobile Terminal 2 to the base station are respectively marked as $h_1$ and $h_2$. The distance between the two mobile terminals are long enough to keep the two fading channels independent of each other. In the embodiment of the present invention, the operations of transmitting and receiving are described from the angle of the mobile terminals.

The following embodiment includes two mobile terminals, e.g. Mobile Terminal 1 and Mobile Terminal 2.

Figure 5:
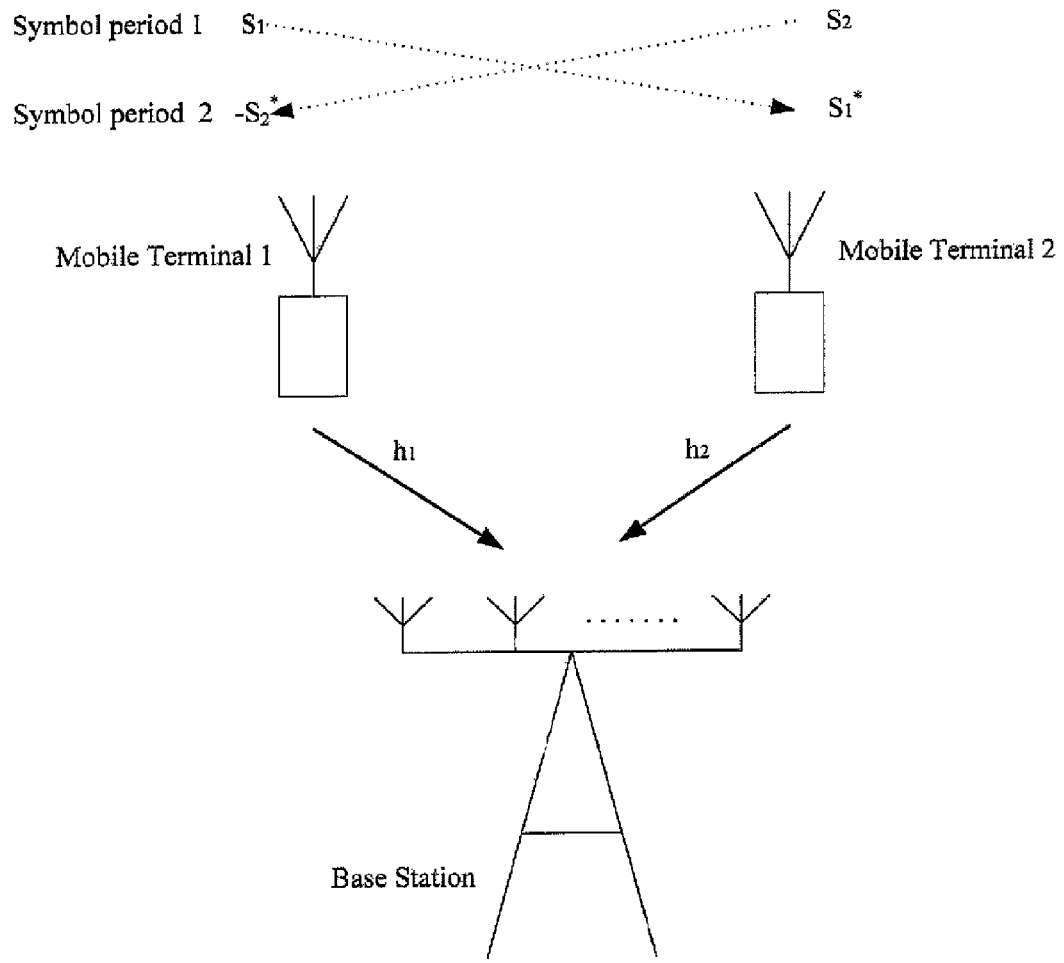
FIG. 5 is a schematic diagram illustrating a system for implementing transmitting diversity on mobile terminals according to the fourth embodiment of the present invention.

FIG. 5 is a schematic diagram illustrating a system for implementing transmitting diversity on mobile terminals according to the fourth embodiment of the present invention. Solid lines with arrows in the figure indicate the transmission path of symbols in the wireless LAN and dotted lines with arrows indicate transmission path of symbols via at least one of the infrared device, Bluetooth device and Zigbee device.

Figure 6:
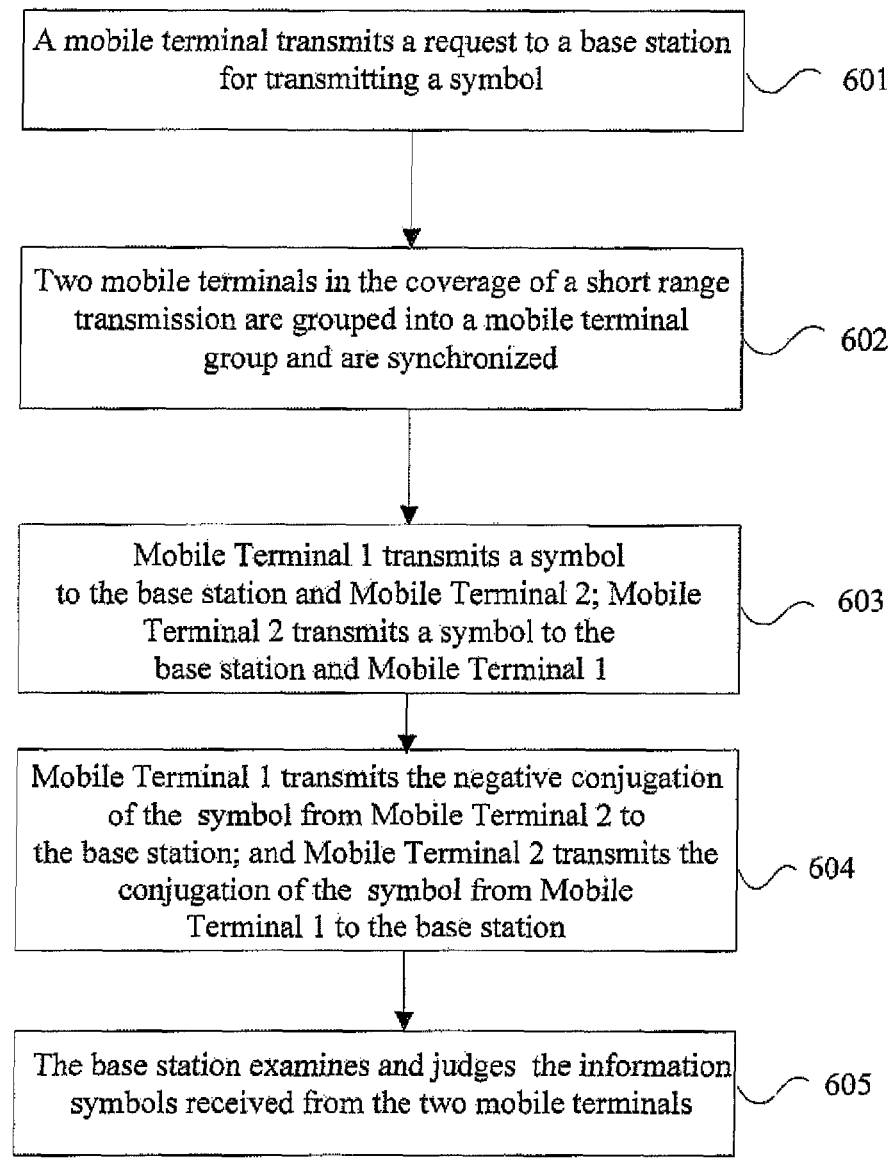
FIG. 6 is a simplified flow chart of a method for implementing transmitting diversity on mobile terminals according to the fifth embodiment of the present invention.

FIG. 6 is a simplified flow chart of a method for implementing transmitting diversity on mobile terminals according to the fifth embodiment of the present invention. The method includes the following processes.

In block 601, Mobile Terminal 1, which is in the service area of a base station, transmits a request to the base station for transmitting a symbol, the base station responds to the request. At the same time, Mobile Terminal 2, which is in the coverage of short range wireless transmission from Mobile Terminal 1, also transmits a request to the base station for transmitting a symbol.

In block 602, Mobile Terminal 1 and Mobile Terminal 2 are grouped into a group, mobile terminal group configuration information is obtained and transmitted to Mobile Terminal 1 and Mobile Terminal 2. Mobile Terminal 1 and Mobile Terminal 2 process symbols according to space-time coding rules here the space-time coding process includes coding, according to the principle that a diversity gain may be obtained after processing the symbols at a receiver, the symbols to be transmitted by the mobile terminals in the mobile terminal group at a receiver, and obtaining the symbols to be transmitted by the mobile terminals at different symbol periods.

In the block, several methods can be employed to group Mobile Terminals 1 and 2, which are hereinafter described as follows.

According to the first method, the base station receives a request for transmitting a symbol from Mobile Terminal 1 or 2, and groups the two mobile terminals into a group.

According to the second method, provided Mobile Terminals 1 and 2 are in a self-organized network, Mobile Terminal 1 searches for Mobile Terminal 2 in the coverage of short range wireless transmission from Mobile Terminal 1 and sends the information of Mobile Terminal 2 to the base station, or Mobile Terminal 2 searches for Mobile Terminal 1 in the coverage of short range wireless transmission from Mobile Terminal 2 and sends the information of Mobile Terminal 1 to the base station. The base station groups the two mobile terminals into a group.

According to the third method, Mobile Terminal 1 searches for Mobile Terminal 2 in the coverage of short range wireless transmission from Mobile Terminal 1, forms a mobile terminal group with Mobile Terminal 2, obtains mobile terminal group configuration information, and transmits the mobile terminal group configuration information to the base station as well as to Mobile Terminal 2.

In block 603, after being synchronized, Mobile Terminal 1 transmits to-be-transmitted symbol $s_1$ to the base station and transmits symbol $s_1$ via the infrared technology, Bluetooth technology, or Zigbee technology to Mobile Terminal 2 at symbol period 1. At the same time, Mobile Terminal 2 transmits to-be-transmitted symbol $s_2$ to the base station and transmits symbol $s_2$ via the infrared technology, Bluetooth technology, or Zigbee technology to Mobile Terminal 1.

In block 604, Mobile Terminal 1 and Mobile Terminal 2 transmit symbols $-s_2^*$ and $s_1^*$ to the base station respectively at symbol period 2, here is the conjugation of s. The symbols transmitted at symbol period 1 and symbol period 2 from the two mobile terminals form a 2*2 orthogonal matrix, so that the base station may filter out the signals from each mobile terminal by using a weighted combination algorithm when calculating an estimate value of an original transmitted signal.

The signal received by the base station at symbol period 1 is expressed as:

$$r_1 = h_1 s_1 + h_2 s_2 + n_1,$$

and the signal received by the base station at symbol period 2 is expressed as:

$$r_2 = -h_1 s_2^* + h_2 s_1^* + n_2.$$

Here $n_1$ and $n_2$ indicate an additive Gaussian white noise received by the base station at symbol period 1 and symbol period 2 respectively.

The calculation performed by the base station on the signals to be examined includes:

$$\hat{s}_1 = h_1^* r_1 + h_2 r_2^*$$

$$\hat{s}_2 = h_2^* r_1 - h_1 r_2^*.$$

Here the $\hat{s}$ is the estimate value of the s. The symbols from Mobile Terminal 1 and Mobile Terminal 2 are respectively filtered via the procession of weighted combination.

In block 605, the base station examines and judges, according to the ML criteria, the original transmitted symbols $s_1$ and $s_2$, and obtains an estimate value.

In the embodiment, it should be noted that each mobile terminal just assistants other mobile terminals which are in the same mobile terminal group with the mobile terminal in transmitting a symbol. Function of interpreting contents of the signals from other mobile terminals is disabled in the mobile terminals.

Figure 7:
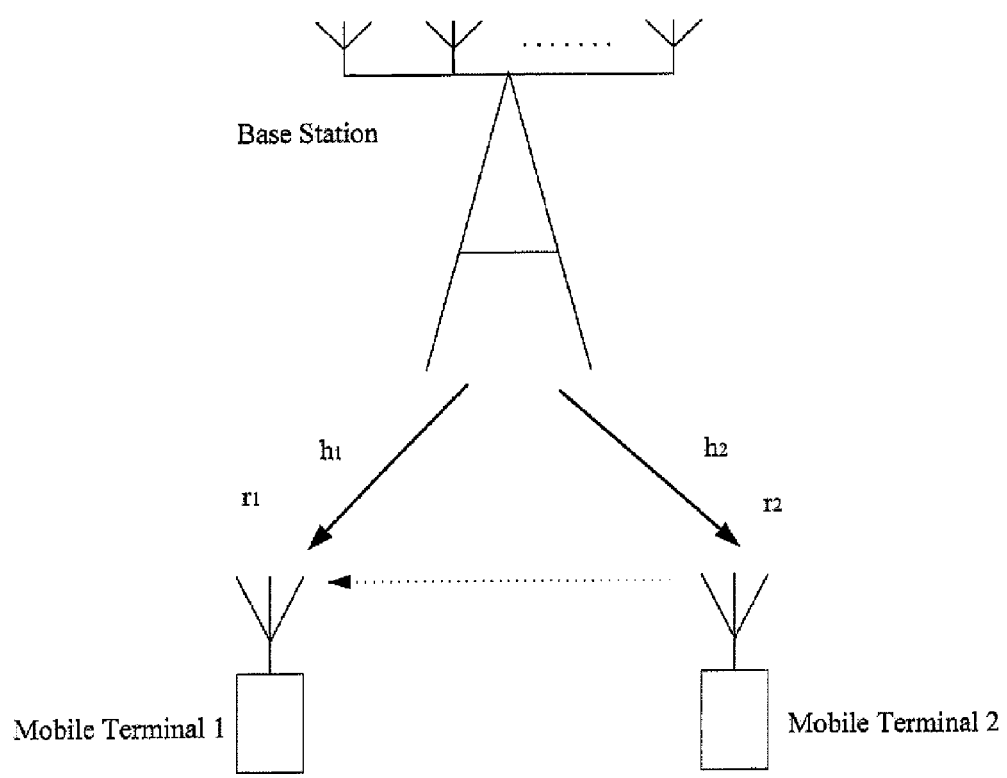
FIG. 7 is a schematic diagram illustrating a system for implementing receiving diversity on mobile terminals according to the sixth embodiment of the present invention.

FIG. 7 is a schematic diagram illustrating a system for implementing receiving diversity on mobile terminals according to the sixth embodiment of the present invention. Solid lines with arrows in the figure indicate the transmission path of symbols in a wireless LAN and dotted lines with arrows indicate transmission of symbols via the infrared technology, the Bluetooth technology or the Zigbee technology.

Figure 8:
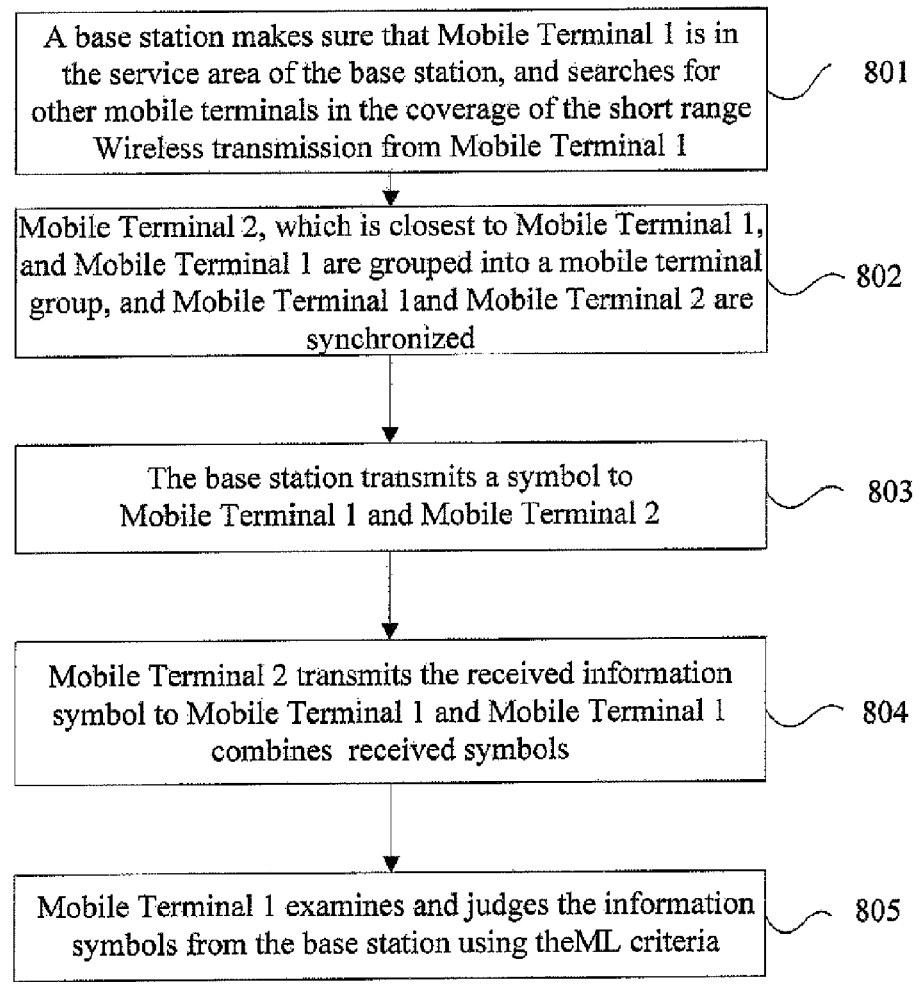
FIG. 8 is a simplified flow chart of a method for implementing receiving diversity on mobile terminals according to the seventh embodiment of the present invention.

FIG. 8 is a simplified flow chart of a method for implementing receiving diversity on mobile terminals according to the seventh embodiment of the present invention, in which the base station is supposed to transmit symbol s to Mobile Terminal 1. The embodiment includes the following processes.

In block 801, a base station determines, via a positioning method such as the GPS, that Mobile Terminal 1 is in the service area of itself, and searches for other mobile terminals in the coverage of short range wireless transmission from Mobile Terminal 1.

In block 802, Mobile Terminal 2, which is closest to Mobile Terminal 1, forms a mobile terminal group with Mobile Terminal 1. Mobile terminal group configuration information is obtained and transmitted to Mobile Terminals 1 and Mobile Terminal 2 which will assist Mobile Terminal 1 in receiving information. The mobile terminals in the group are synchronized as well.

In the block, the method used for grouping Mobile Terminal 2, which is closest to Mobile Terminal 1, and Mobile Terminal 1 is similar to the method adopted in block 602, and thus will not be described repeatedly herein.

In block 803, at the next symbol period after synchronizing Mobile Terminal 1 and Mobile Terminal 2 in the mobile terminal group, the base station transmits a symbol s to Mobile Terminal 1 and Mobile Terminal 2 via channels $h_1$ and $h_2$ respectively, here $h_1$ and $h_2$ are the channels from the base station to Mobile Terminal 1 and Mobile Terminal 2.

Signal received by Mobile Terminal 1 is expressed as:

$$r_1 = h_1 s + n_1;$$

and signal received by Mobile Terminal 2 is expressed as:

$$r_2 = h_2 s + n_2,$$

here $n_1$ and $n_2$ indicate the additive Gaussian white noise received by Mobile Terminal 1 and Mobile Terminal 2 respectively.

In block 804, Mobile Terminal 2 transmits the received symbol $r_2$ to Mobile Terminal 1, and Mobile Terminal 1 combines symbols received from the base station directly and from Mobile Terminal 2. If signal s is supposed to be transmitted from the base station to Mobile Terminal 2, Mobile Terminal 1 shall transmit signal $r_1$ to Mobile Terminal 2, and Mobile Terminal 2 combines symbols received from the base station directly and from Mobile Terminal 1. The structure of a system containing Mobile Terminal 1 and Mobile Terminal is similar to the system shown in FIG. 7, but the arrows on the dotted lines points to opposite directions. In this block, the infrared technology, the Bluetooth technology or the Zigbee technology may be adopted for the transmission.

The processing of combining the symbols received by Mobile Terminal 1 is expressed as:

$$\hat{s} = h_1^* r_1 + h_2^* r_2.$$

In block 805, Mobile Terminal 1 examines and judges signal s from the base station by using the ML criteria.

According to the eighth embodiment of the present invention, the virtual multiple antenna system in the following embodiment includes four mobile terminals. A base station in the embodiment has a single antenna. Fading channels from Mobile Terminals 1, 2, 3 and 4 to the base station are marked as $h_1, h_2, h_3$ and $h_4$ respectively. The four mobile terminals are far enough from each other to keep the four fading channels independent of each other.

When the mobile terminals transmits signals to the base station and when transmitted symbols $s_1, s_2, s_3$ and $s_4$ are real number signals, a transmit matrix comprised of the symbols transmitted by the four mobile terminals at four consecutive symbol periods is expressed as:

$$\begin{bmatrix} s_1 & s_2 & s_3 & s_4 \\ -s_2 & s_1 & -s_4 & s_3 \\ -s_3 & s_4 & s_1 & -s_2 \\ -s_4 & -s_3 & s_2 & s_1 \end{bmatrix}.$$

If the transmitted signals are complex number signals, a transmit matrix comprised of the symbols transmitted at eight consecutive symbol periods is expressed as:

$$\begin{bmatrix} s_1 & s_2 & s_3 & s_4 \\ -s_2 & s_1 & -s_4 & s_3 \\ -s_3 & s_4 & s_1 & -s_2 \\ -s_4 & -s_3 & s_2 & s_1 \\ s_1^* & s_2^* & s_3^* & s_4^* \\ -s_2^* & s_1^* & -s_4^* & s_3^* \\ -s_3^* & s_4^* & s_1^* & -s_2^* \\ -s_4^* & -s_3^* & s_2^* & s_1^* \end{bmatrix}.$$

Here the method of transmitting the symbols at the first four symbol periods is identical with the method of transmitting real number signals, and signals transmitted at the last four symbol periods are conjugations of the signals transmitted at the first four symbol periods.

Transmit matrixes are not limited to the above matrixes, any orthogonal matrix or quasi-orthogonal matrix is acceptable as long as a receiver may filter out a signal transmitted from a mobile terminal after performing a weighted combination.

Having received the symbols, the base station performs the weighted combination on the received signals. When the received signals are real number signals, the signals received at symbol period 1, symbol period 2, symbol period 3 and symbol period 4 are expressed as:

$$r_1 = h_1 s_1 + h_2 s_2 + h_3 s_3 h_4 s_4 + n_1;$$

$$r_2 = -h_1 s_2 + h_2 s_1 - h_3 s_4 + h_4 s_3 + n_2;$$

$$r_3 = -h_1 s_3 + h_2 s_4 + h_3 s_1 - h_4 s_2 + n_3;$$

$$r_4 = -h_1 s_4 - h_2 s_3 + h_3 s_2 + h_4 s_1 + n_4;$$

here $n_1$ to $n_4$ indicate the additive Gaussian white noise received by the base station at symbol period 1, symbol period 2, symbol period 3 and symbol period 4 respectively.

When the transmitted signals are complex number signals, the signals received at symbol period 1 to symbol period 8 are expressed as:

$$r_1 = h_1 s_1 + h_2 s_2 + h_3 s_3 h_4 s_4 + n_1;$$

$$r_2 = -h_1 s_2 + h_2 s_1 - h_3 s_4 + h_4 s_3 + n_2;$$

$$r_3 = -h_1 s_3 + h_2 s_4 + h_3 s_1 - h_4 s_2 + n_3;$$

$$r_4 = -h_1 s_4 - h_2 s_3 + h_3 s_2 + h_4 s_1 + n_4;$$

$$r_5 = h_1 s_1^* + h_2 s_2^* + h_3 s_3^* + h_4 s_4^* + n_5;$$

$$r_6 = -h_1 s_2^* + h_2 s_1^* - h_3 s_4^* + h_4 s_3^* + n_6;$$

$$r_7 = -h_1 s_3^* + h_2 s_4^* + h_3 s_1^* - h_4 s_2^* + n_7;$$

$$r_8 = -h_1 s_4^* - h_2 s_3^* + h_3 s_2^* + h_4 s_1^* + n_8;$$

Here $n_1$ to $n_8$ indicate the additive Gaussian white noise received by the base station at symbol period 1 to symbol period 8 respectively.

The base station calculates the to-be-examined values which will be sent to base station examining and judging units. When the transmitted signals are real number signals, the signals to be sent to four base station examining and judging units are:

$$\hat{s}_1 = h_1 r_1 + h_2 r_2 + h_3 r_3 + h_4 r_4;$$

$$\hat{s}_2 = h_2 r_1 - h_1 r_2 - h_4 r_3 + h_3 r_4;$$

$$\hat{s}_3 = h_3 r_1 + h_4 r_2 - h_1 r_3 - h_2 r_4; \text{ and}$$

$$\hat{s}_4 = -h_4 r_1 - h_3 r_2 + h_2 r_3 - h_1 r_4.$$

When the transmitted signals are complex number signals, the signals to be sent to the four base station examining and judging units are:

$$\hat{s}_1 = h_1^* r_1 + h_2^* r_2 + h_3^* r_3 + h_4^* r_4 h_1 r_5^* + h_2 r_6^* + h_3 r_7^* + h_4 r_8^*;$$

$$\hat{s}_2 = h_2^* r_1 - h_1^* r_2 - h_4^* r_3 + h_3^* r_4 + h_2 r_5^* - h_1 r_6^* - h_4 r_7^* + h_3 r_8^*;$$

$$\hat{s}_3 = h_3^* r_1 + h_4^* r_2 - h_1^* r_3 - h_2^* r_4 + h_3 r_5^* + h_4 r_6^* - h_1 r_7^* - h_2 r_8^*; \text{ and}$$

$$\hat{s}_4 = -h_4^* r_1 - h_3^* r_2 + h_2^* r_3 - h_1^* r_4 - h_4 r_5^* - h_3 r_6^* + h_2 r_7^* - h_1 r_8^*.$$

Finally, the base station examines and judges the four original transmitted signals $s_1$, $s_2$, $s_3$ and $s_4$ from the four mobile terminals respectively by using the ML criteria based on the to-be-examined values.

When the base station transmits the symbol to a destination mobile terminal, at the next symbol period of the synchronization in the mobile terminal group, the base station transmits symbol s, which is supposed to be sent to the destination mobile terminal, to Mobile Terminals 1, 2, 3 and 4 via channels $h_1$, $h_2$, $h_3$ and, i.e., the four channels from the base station to Mobile Terminal 1, Mobile Terminal 2, Mobile Terminal 3 and Mobile Terminal 4 respectively. Hence the signals received by Mobile Terminals 1 to 4 are:

$$r_1 = h_1 s + n_1;$$

$$r_2 = h_2 s + n_2;$$

$$r_3 = h_3 s + n_3; \text{ and}$$

$$r_4 = h_4 s + n_4.$$

Here $n_1$ to $n_4$ indicate the additive Gaussian white noise received by Mobile Terminals 1 to 4 respectively.

When symbol s is supposed to be transmitted by the base station to Mobile Terminal 1, that is to say, Mobile Terminal 1 is the destination mobile terminal. Mobile Terminals 2 to 4 transmit received symbols $r_2$ to $r_4$ to Mobile Terminal 1 by using the infrared technology, the Bluetooth technology or the Zigbee technology. Mobile Terminal 1 combines the received symbols, examines and judges the combined symbol to obtain the original transmitted symbol. If symbol s is supposed to be transmitted by the base station to Mobile Terminal 2, that is to say, Mobile Terminal 2 is the destination mobile terminal, Mobile Terminal 1, Mobile Terminal 3 and Mobile Terminal 4 transmit received symbols $r_1$, $r_3$ and $r_4$ to Mobile Terminal 2 by using the infrared technology, the Bluetooth technology or the Zigbee technology, Mobile Terminal 2 combines the received symbols, examines and judges the combined symbol to obtain an original transmitted symbol. If Mobile Terminal 3 or 4 is the destination mobile terminal, the process can be deduced accordingly.

The weighted combination performed by a terminal combining unit in the destination mobile terminal with the received signals is expressed as:

$$\hat{s} = h_1^* r_1 + h_2^* r_2 + h_3^* r_3 + h_4^* r_4.$$

Finally, the destination mobile terminal examines and judges the original transmitted symbol s from the base station by using the ML criteria.

It should be noted that, in the embodiment, other mobile terminals in the same mobile terminal group just assistant the destination terminal in receiving a signal. Function of interpreting contents of signals from other mobile terminals should be disabled.

In the following description, the performance of the technical scheme provided by embodiments of the present invention is compared with the performance of the conventional virtual multiple antenna system in an emulation of a system BER. The two systems have similar structures, that is to say, each of the systems has two mobile terminals in a wireless network, and that the fading channels on the downlink from the base station to the two mobile terminals and the fading channels in uplink from the two mobile terminals to the base station in each of the systems follow a complex Gaussian distribution with zero mean and unit variance. The fading channels can be expressed as:

$$h_m = \text{Normal}\left(0, \frac{1}{\sqrt{2}}\right) + \sqrt{-1} \cdot \text{Normal}\left(0, \frac{1}{\sqrt{2}}\right), m = 1, 2.$$

Here $h_m$ (m=1,2) indicates a fading channel on the downlink from Mobile Terminal m to the base station, or a fading channel in uplink from the base station to Mobile Terminal m.

The system processes $2\times10^6$ independent Monte Carlo channel samples at a time.

Figure 9:
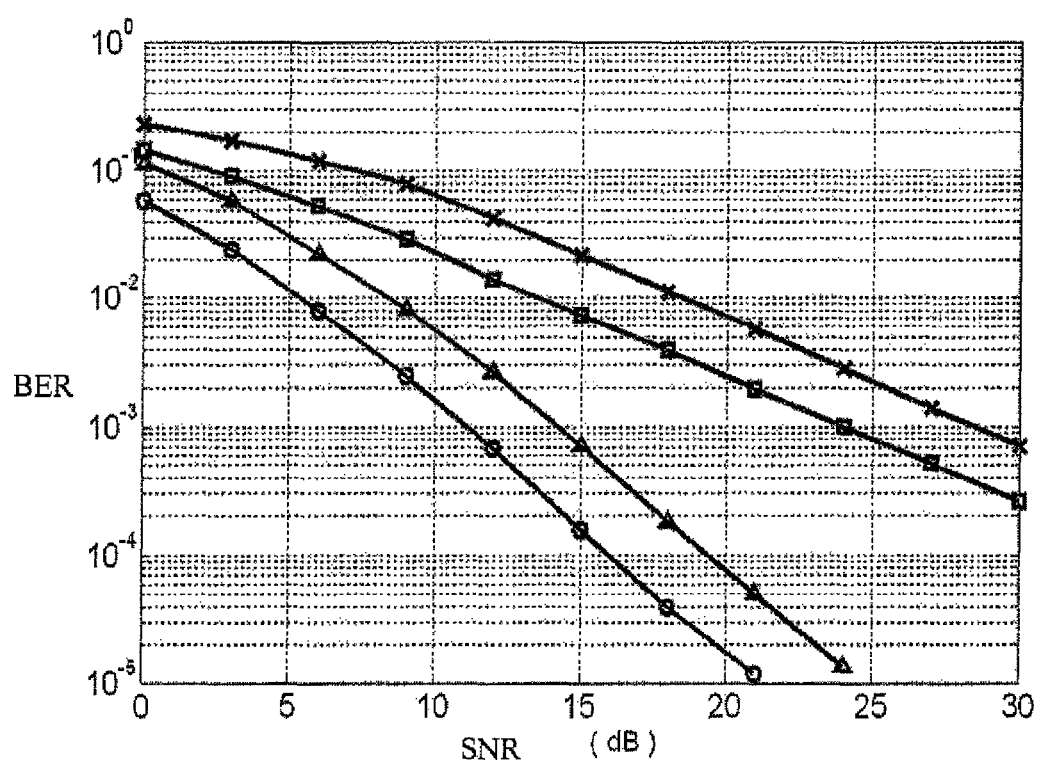
FIG. 9 is a diagram illustrating the result of the emulation of BER performance in two systems with different SNRs.

FIG. 9 is a diagram illustrating the result of the BER performance emulation in the two systems with different SNRs. The line with crossed marks in the figure indicates the BER in the conventional virtual multiple antenna system, the line with squares indicates the BER in a single antenna transmit and single antenna receive system, the line with triangles indicates the BER of transmit diversity in uplink in an embodiment of the present invention, and the line with circles indicates the BER of receive diversity on downlink in an embodiment of the present invention.

As shown in the diagram, though the conventional virtual multiple antenna system achieves relatively high frequency efficiency by using a space multiplexing technique, offers poor BER performance. With the same SNR, the BER in the conventional virtual multiple antenna system is higher than the BER in the conventional single antenna transmit and single antenna receive system. In embodiments of the present invention, the transmit diversity in uplink and the receive diversity on downlink is achieved with the infrared technology, Bluetooth technology or Zigbee technology in the system. The system in embodiments of the present invention offers a transmission rate which equals to the transmission rate in the conventional single antenna transmit and single antenna receive system, but obtains a diversity gain which greatly improves the BER performance of the system. With the same SNR, the BER in the system of embodiments of the present invention is far lower than the BER in the conventional single antenna transmit and single antenna receive system.

In embodiments of the present invention, the communication between the base station and the mobile terminals may be performed in both directions at the same time by using a frequency division duplex (FDD) technique, that is to say, a frequency is capable of transmitting signals on the downlink from the base station to the mobile terminals while another frequency is capable of transmitting signals in uplink from the mobile terminals to the base station.

In addition, the division of uplink and downlink can also be achieved with time division duplex (TDD) on the same frequency, that is to say, in one time slot all communication frequencies are used in uplink from the base station to the mobile terminals while in another time slot all communication frequencies are used in downlink from the mobile terminals to the base station. Therefore the FDD or the TDD may be used for allocating the uplink and downlink.

It should be noted that in embodiments of the present invention, the mobile terminal group may includes a single antenna mobile terminal group or a multiple antenna mobile terminal group, and the mobile terminals may be single antenna mobile terminals or multiple antenna mobile terminals. Single antenna mobile terminal group and single antenna mobile terminals provide better technical effect in the embodiments of the present invention.

It should be emphasized that the above-described embodiments, particularly, any embodiments, are merely possible examples of implementations, merely set forth for a clear understanding of the principles of the invention. Many variations and modifications may be made according to the above preferred embodiments without departing substantially from the spirit and principles of the invention. All such modifications and variations are intended to be included herein within the scope of this disclosure and the above preferred embodiments and protected by the following claims.

The invention claimed is:

1. A method for implementing transmitting diversity, the method comprising:
   receiving a symbol from a destination mobile terminal, by a mobile terminal which is in a same mobile terminal group with the destination mobile terminal, wherein the symbol is also sent from the destination mobile terminal to a base station; and
   processing, by the mobile terminal, the symbol and transmitting the symbol processed to the base station;
   wherein processing the symbol and transmitting the symbol processed to the base station comprises:
   processing, by the mobile terminal, the symbol according to space-time coding rules, and
   transmitting the symbol processed to the base station via time division;
   wherein transmitting the symbol processed to the base station via time division comprises:
   transmitting, if the symbol is a complex number signal and the number of mobile terminals in the mobile terminal group is N, the symbol, a reciprocal value of the symbol, a conjugation of the symbol or a negative conjugation of the symbol to the base station at 2N consecutive symbol periods by the N mobile terminals; and
   wherein 2N*N transmitted signals are determined by a 2N*N quasi-orthogonal matrix, N*N elements in the first N rows of the 2N*N quasi-orthogonal matrix constitute an N-order orthogonal matrix and N*N elements in the last N rows are a negative conjugation of the N*N elements in the first N rows, wherein the N is not equal to 2.

2. The method of claim 1, further comprising:
   setting up the mobile terminal group in advance in the coverage of short range wireless transmission, obtaining mobile terminal group configuration information and transmitting the mobile terminal group configuration information to at least one other mobile terminal in the mobile terminal group.

3. The method of claim 1, wherein receiving the symbol from the destination mobile terminal comprises:
   receiving the symbol from the destination mobile terminal via a short range wireless transmission technology.

4. The method of claim 3 wherein receiving the symbol via the short range wireless transmission technology comprises:
   receiving the symbol by the mobile terminal via the infrared technology, Bluetooth technology, or Zigbee technology.

5. The method of claim 1, after transmitting the symbol processed to the base station, further comprising:
   combining, by the base station, the symbol processed from the mobile terminal and the symbol from the destination mobile terminal, examining and judging the symbol combined, and obtaining an estimate value of an original transmitted symbol.

6. The method of claim 1, further comprising:
   receiving, by a mobile terminal, a symbol from a base station;

finding a destination mobile terminal which is in the same mobile terminal group with the mobile terminal if the mobile terminal is not the destination of the symbol; and forwarding the symbol to the destination mobile terminal.

7. The method of claim 6, after forwarding the symbol to the destination mobile terminal, further comprising:

combining symbols received by the destination mobile terminal.

8. The method of claim 7, further comprising:

examining and judging symbol combined by the destination mobile terminal by using the maximum likelihood (ML) criteria, and obtaining an estimate value of an original transmitted symbol.

9. The method of claim 6, further comprising:

setting up the mobile terminal group in advance in the coverage of short range wireless transmission, obtaining mobile terminal group configuration information and transmitting the mobile terminal group configuration information to a plurality of mobile terminals in the mobile terminal group.

10. The method of claim 6, wherein forwarding the symbol to the destination mobile terminal comprises:

forwarding the symbol to the destination mobile terminal via the infrared technology, Bluetooth technology, or Zigbee technology.

* * * * *